(12) United States Patent
Raju

(10) Patent No.: US 11,023,454 B2
(45) Date of Patent: Jun. 1, 2021

(54) CHECKING DATA INTEGRITY IN INCREMENTAL JOURNALING

(71) Applicant: EMC IP Holding Company LLC, Hopkinton, MA (US)

(72) Inventor: Suraj Raju, Issaquah, WA (US)

(73) Assignee: EMC IP Holding Company LLC, Hopkinton, MA (US)

(*) Notice: Subject to any disclaimer, the term of this patent is extended or adjusted under 35 U.S.C. 154(b) by 303 days.

(21) Appl. No.: 16/216,187

(22) Filed: Dec. 11, 2018

(65) Prior Publication Data

US 2020/0183912 A1 Jun. 11, 2020

(51) Int. Cl.
| | | |
|---|---|---|
| G06F 17/30 | (2006.01) | |
| *G06F 16/23* | (2019.01) | |
| *G06F 16/18* | (2019.01) | |
| *H03M 13/09* | (2006.01) | |
| *G06F 21/64* | (2013.01) | |
| *G06F 16/11* | (2019.01) | |

(52) U.S. Cl.
CPC ........ *G06F 16/2365* (2019.01); *G06F 16/122* (2019.01); *G06F 16/1815* (2019.01); *G06F 21/64* (2013.01); *H03M 13/09* (2013.01)

(58) Field of Classification Search
CPC .......... G06F 16/11; G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,718,481 B1 | 4/2004 | Fair | |
| 7,219,260 B1 | 5/2007 | de Forest et al. | |
| 7,613,806 B2 | 11/2009 | Wright et al. | |
| 9,158,804 B1 | 10/2015 | Rangapuram et al. | |
| 9,542,396 B1 | 1/2017 | Pawar et al. | |
| 9,734,157 B1 | 8/2017 | Brahma Raju et al. | |
| 10,474,534 B1 | 11/2019 | Rangapuram et al. | |
| 10,628,263 B1* | 4/2020 | Cowen | G06F 11/1435 |
| 10,824,512 B2 | 11/2020 | Resnik et al. | |
| 2007/0022264 A1* | 1/2007 | Bromling | H04L 67/1097 711/162 |
| 2007/0266037 A1* | 11/2007 | Terry | G06F 3/0607 |

(Continued)

OTHER PUBLICATIONS

Office Action dated Dec. 23, 2020 for U.S. Appl. No. 16/225,954, 30 pages.

*Primary Examiner* — Hung D Le
(74) *Attorney, Agent, or Firm* — Amin, Turocy & Watson, LLP

(57) ABSTRACT

Incremental inline journaling in a journaled file system can be utilized to facilitate concurrency and throughput of a journaled file system. In an example, a request can be received for a transaction to modify a sub-block portion of a file stored in a distributed storage system. In response to that, the modification can be allocated to a data structure in a journal of the distributed storage system. After the transaction commits, a current value of the sub-block portion of the file can be saved to the delta structure. Then, a new value corresponding to the request for the transaction to modify the sub-block portion of the file can be written to the metadata block. After writing the new value to the metadata block, a memory space used to store the delta structure can be freed.

20 Claims, 10 Drawing Sheets

(56) References Cited

U.S. PATENT DOCUMENTS

| | | |
|---|---|---|
| 2008/0046667 A1 | 2/2008 | Fachan et al. |
| 2009/0106334 A1* | 4/2009 | Day .................... G06F 16/1865 |
| 2009/0106758 A1* | 4/2009 | Giampaolo ......... G06F 16/1865 |
| | | 718/101 |
| 2014/0337562 A1* | 11/2014 | Long ................... G06F 12/0804 |
| | | 711/103 |
| 2017/0177447 A1 | 6/2017 | Golander et al. |

\* cited by examiner

CHECKING DATA INTEGRITY IN INCREMENTAL JOURNALING

TECHNICAL FIELD

The present application relates generally to techniques for modification of files stored in journaled computer file systems, and more specifically, to checking the integrity of data in a journaled file system that implements incremental journaling.

BACKGROUND

A distributed storage system generally is a form of computer data storage that can provide remote data storage and access to one or more client computers. In some embodiments, multiple users or client computers can have access to alter at least some of the data stored in the distributed storage system.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
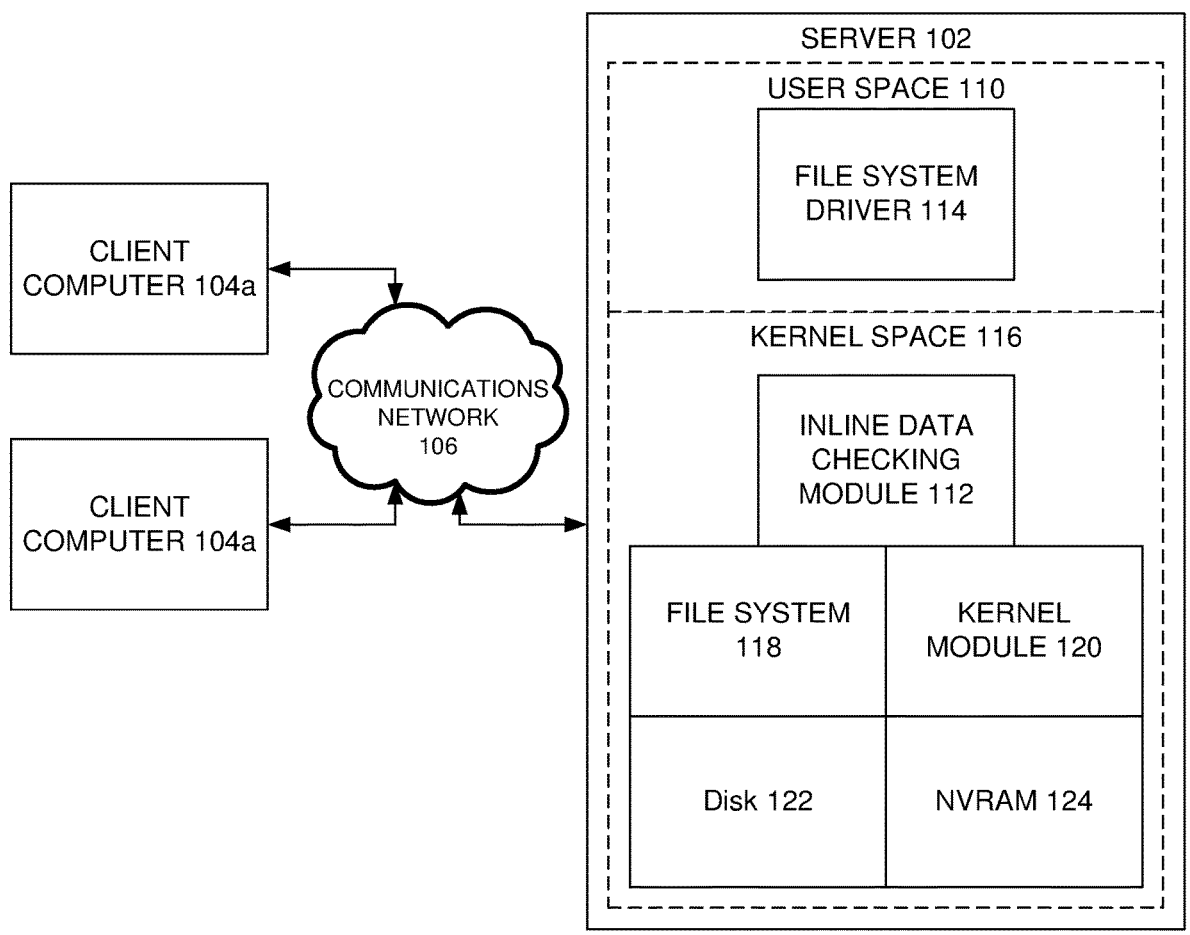
FIG. 1 illustrates a block diagram of an example system that can facilitate checking data integrity in incremental journaling, in accordance with certain embodiments of this disclosure.

As described herein, a distributed storage system can have an operating system. The operating system can provide updates to one or more remote computers about changes to files in the distributed storage system, using an application-layer network protocol. The present disclosure generally describes embodiments where the distributed storage system can be an EMC Isilon Cluster distributed storage system, and the file system can be an EMC Installable File System (IFS). It can be appreciated that there are other embodiments that utilize different technologies than described herein.

A file system of a distributed storage system can be journaled. In a journaled file system, journal deltas can facilitate limited concurrent transaction support by allowing concurrent order independent operations to blocks, without holding the blocks locked for the duration of the operations. Delta operations stored in a journal can reference to a copy of a block that stored in the journal. This block can be called a predecessor block. When applying a delta, a journal can first try to find a predecessor block. If such a predecessor block does not exist, then the journal can create one by reading the block. If a transaction with deltas is aborted, then one or more corresponding deltas that are stored in a journal can be reclaimed.

Journal deltas can facilitate some concurrent transaction support by allowing concurrent operations to blocks (i.e., multiple concurrent operations to one block), without holding a block locked exclusively for the duration of the operations. Delta operations that are stored in a journal can reference to a copy of the block that is stored in the journal, and this block can be referred to as a predecessor block.

When applying a delta, a journal can first search for a corresponding predecessor block. Where a journal cannot locate a corresponding predecessor block (e.g., such a predecessor block does not exist), the journal can create a predecessor block based on the corresponding data block. Where a transaction that involves deltas is aborted, then deltas that are stored in the Journal for that transaction can be reclaimed.

There can be different approaches for expiring deltas of a committed transaction. One approach can be to use a delta reaper process for unlinking deltas of a committed transaction. A delta reaper process can simultaneously update the predecessor block in a journal with information from a delta, and then also mark the corresponding committed delta as invalid, as appropriate. A delta reaper process can invalidate these deltas by storing a reference to these deltas in blocks that can be referred to as reaper blocks, followed by updating a predecessor block using a transaction. A delta reaper can hold an exclusive buf lock during this operation, which can involve scanning the deltas to select one or more reapable candidates (i.e., deltas of a committed transaction that can be unlinked), transactionally updating the predecessor block with information from these one or more deltas, and unlinking these committed deltas.

Since a block can be written as a whole to a journal, either from a delta reaper process, or when a predecessor block is created, and eventually is written to disk, maintaining an inline checksum can be performed to ensure the integrity of a block.

In some examples, a journal delta block can have two different checksums. One of these checksums can be an initiator checksum, which serves as a checksum for a non-delta region of a block, which can be calculated from a Txn descriptor file, and stored inline on disk. Another of these checksums can be a journal checksum, which serves as a checksum for the entire block save for the checksum field in ondisk format.

Then, when deltas are applied, a journal checksum can be updated in memory. That is, when a delta is applied, a corresponding journal checksum can be updated in memory. When a predecessor block is created, a journal checksum can be calculated for the whole predecessor block and this journal checksum can be written to the journal. When writing to the disk, the block can be written with the updated checksum.

Take, for example, a size field inside a block. Using a prior approach, an initiator checksum can be determined for the variables that are stored in this block, save for the size field. Then, when the block is updated, inline data checking module can calculate a checksum for the size field, and this can be a journal checksum. When a block is read, an initiator checksum and a journal checksum from the read block can be determined. It can then be checked whether these newly determined checksums match checksums that have been previously determined, and are stored on disk. When the new and old checksums are determined to match, that can indicate that data integrity is maintained (i.e., the data has not been corrupted, or unknowingly changed somehow). When the new and old checksums are determined to be different, that can indicate that data integrity has been lost (i.e., the data has been corrupted, or unknowingly changed somehow).

A problem with this above approach is that it may not function for inline data checking. Where a process has a lock on an entire block, it can determine an entire checksum for a delta region. But a process may not have a lock on an entire block where inline deltas are implemented. Where inline delta values are implemented, it may be that a predecessor value is read from NVRAM, as opposed to the entire block being read, from which a checksum for the entire block could be determined.

Furthermore, the point-in-time consistent value of a delta field (e.g., offset:size) can be durably recorded, then the corresponding delta block can be freed. This approach can involve atomically updating the predecessor block stored in journal, and unlinking the corresponding delta. This approach can then provide a single-reap-per-delta semantic, and can be accomplished by storing the previous predecessor value in a delta, updating the predecessor block with the new value, and then unlinking the delta. Thus, when deltas are applied inline to a predecessor block, the stored inline checksum can be invalidated.

A solution to this problem is then to incrementally update the journal checksum, i.e., the journal for the entire block save for the checksum field, in ondisk format on the block. The journal can calculate this checksum when writing to memory (e.g., non-volatile random-access memory (NVRAM)), and incrementally update the checksum when a delta is flushed, applied inline in NVRAM. When enabled, at a given point in time, this checksum should match the checksum calculated for the block as read from NVRAM.

Example Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example system that can facilitate checking data integrity in incremental journaling, in accordance with certain embodiments of this disclosure. System 100 comprises server 102, client computer 104a, client computer 104b, and communications network 106. Each of client computer 104a and client computer 104b can be implemented using aspects of computer 1002 of FIG. 10. Communications network 106 can comprise a computer communications network, such as the Internet.

Figure 9:
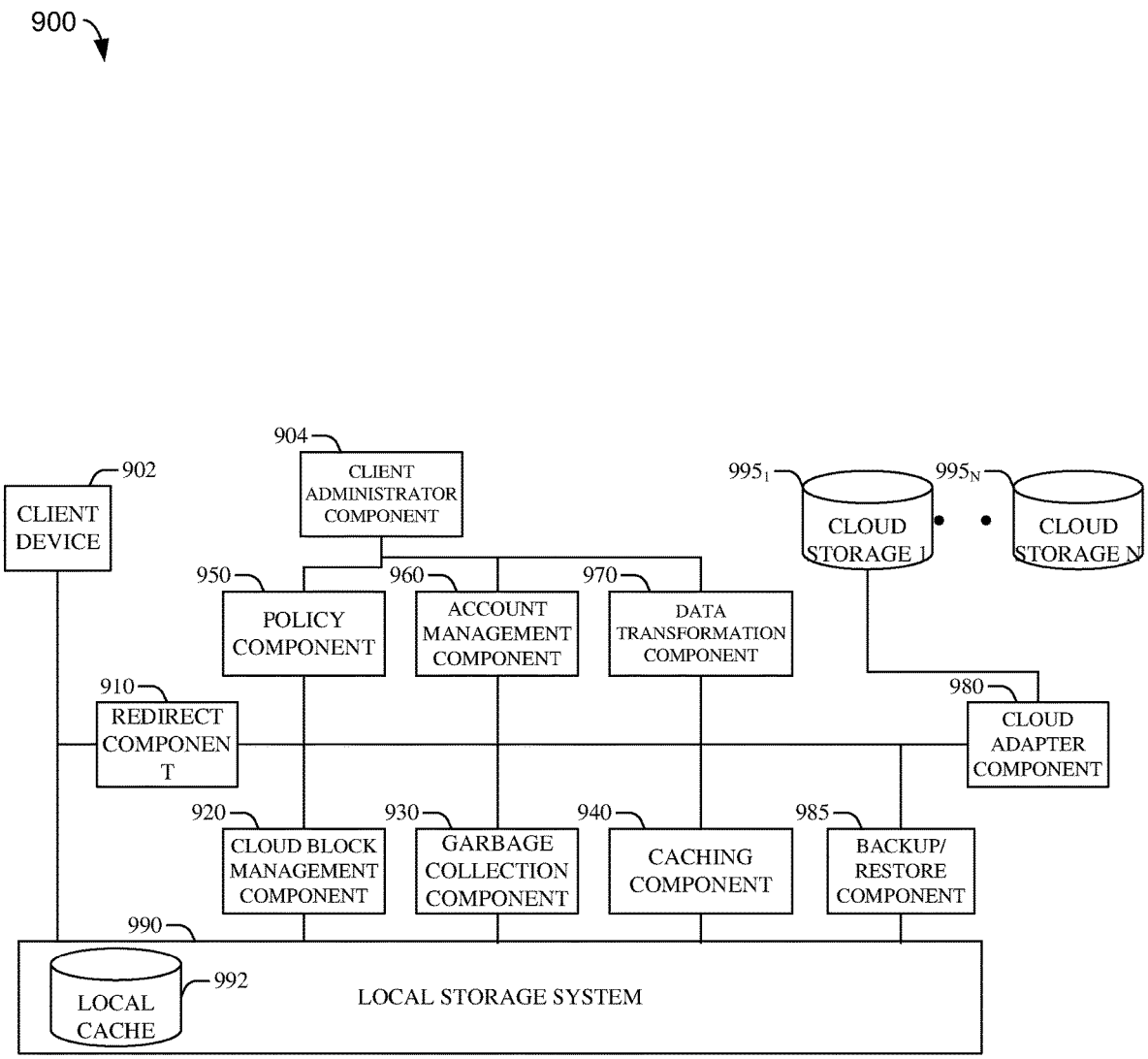
FIG. 9 illustrates a block diagram of an example distributed file storage system that employs tiered cloud storage in accordance with certain embodiments of this disclosure.
Figure 10:
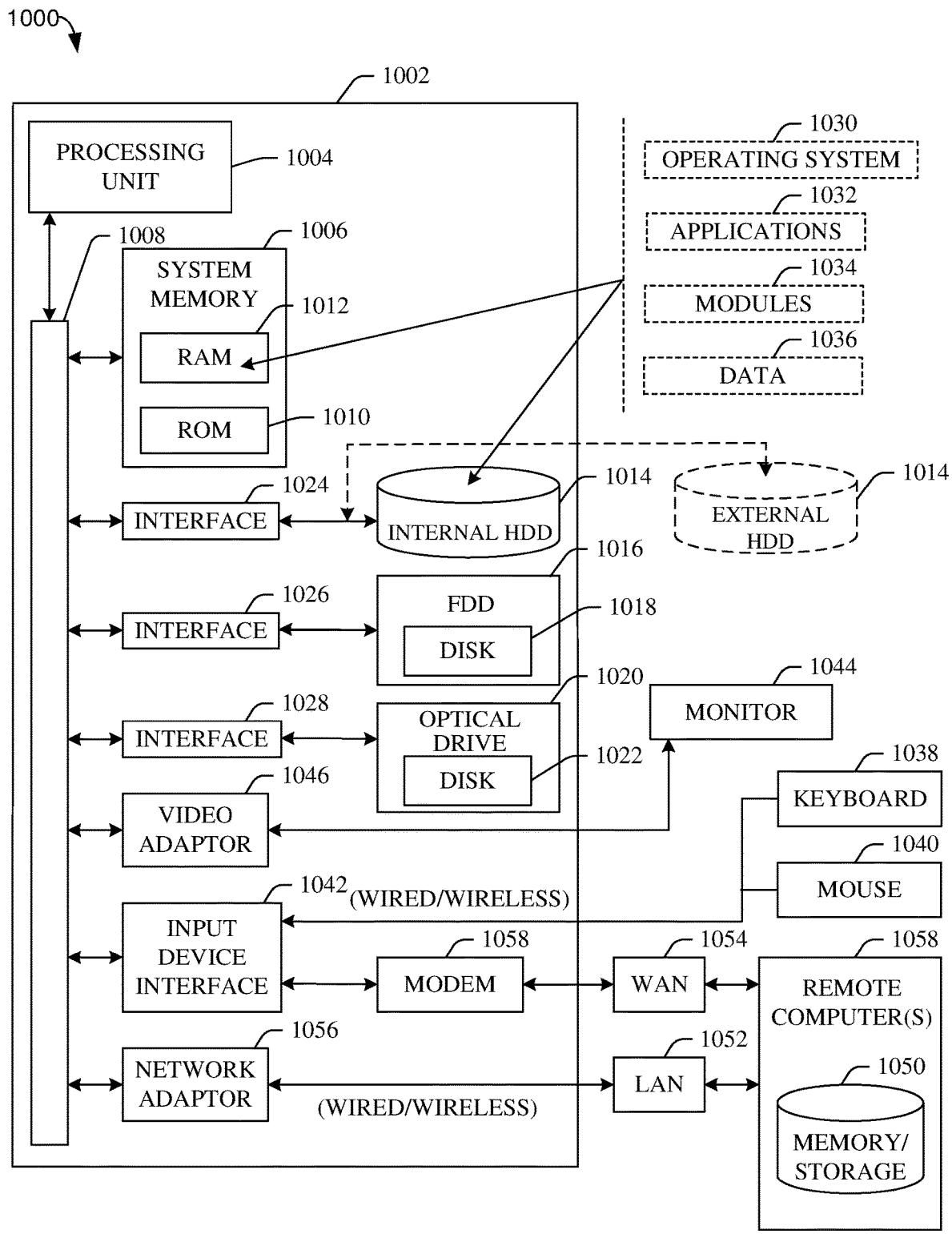
FIG. 10 illustrates an example block diagram of a computer operable to execute certain embodiments of this disclosure.

Server 102 can be implemented using aspects of distributed file storage system 900 of FIG. 9 and computer 1002 of FIG. 10. It can be appreciated that server 102 is presented logically, and that there can be embodiments where server 102 comprises multiple computers. In some examples, server 102 can implement an IFS or a OneFS file system.

As depicted, server 102 comprises user space 110, inline data checking module 112, file system driver 114, kernel space 116, file system 118, kernel module 120, disk 122, and NVRAM 124.

User space 110 can generally be a portion of system memory of server 102 in which user processes run. Then, kernel space 116 can generally be a portion of system memory of server 102 in which kernel processes run Inline data checking module 112 can comprise one or more instances of a process that implements incremental data checking on a file system, such as file system 118. In some examples, inline data checking module 112 can implement aspects of process flow 300 of FIG. 3 to facilitate incremental data checking on a file system.

File system driver 114 can comprise a computer device driver that provides access to a file system (in which incremental data checking can be implemented) of server 102 to one or more applications or modules of server 102, such as inline data checking module 112. Inline data checking module 112 can create and send requests to read from and write to file system 118, and can be part of a journal subsystem, which in turn can be part of file system 118. File system 118 can comprise an organization of data on server 102 into one or more files and/or directories that can contain files. Kernel module 120 can provide some operating system functions for server 102, such as file management and resource allocation.

File system 118 can store one or more files in each of disk 122 and NVRAM 124. In some examples, files of file system 118 can generally be stored on disk 122, while metadata blocks and corresponding delta descriptor files (such as Txn descriptor 210, and delta descriptor 228 of FIG. 2, respectively) can be stored in NVRAM 124.

Server 102 can store and maintain one or more computer files, which can, in turn, be accessed by client computer 104a and/or client computer 104b. Client computer 104a and/or client computer 104b can access these files on server 102 via a server message block (SMB) protocol. In some examples, client computer 104a and/or client computer 104b can send server 102 requests to perform transactions that include modifying a file of server 102.

When server 102 receives a request to perform a transaction that includes modifying a file, this request can be directed to file system driver 114. File system driver 114 can communicate with kernel process 120, which can be responsible for receiving file change events and implementing those events (e.g., modifying a file). Then, inline data checking module 112 (which can be part of file system 118) can determine that such a file modification has been made, will be made, or is being made (e.g., to file system 118), and implement incremental data checking that corresponds to this file change accordingly.

With incremental data checking, inline data checking module 112 can read a predecessor value from a journal block, store the predecessor value in a journal metadata block, apply the delta to the journal block, and update a corresponding NVRAM 124 block with the new data Inline data checking module 112 can also read a current journal checksum for a delta region of a block that's stored in a NVRAM 124 block, and determine an incremental journal checksum (i.e., what a new checksum would be if the delta were applied to the block). Inline data checking module 112 can write a new incremental journal checksum back to a NVRAM 124 checksum. With this approach, inline data checking module 112 can avoid reading an entire block to determine a new checksum, and can instead read a delta region that is being modified.

In inline data checking, the term inline or inlining can be used to indicate that, wherever an operation is intended to be stored at a specific location (e.g., to disk 122 as opposed to memory 124), then it is stored directly without any intervening caching or storing, or being stored on a different medium. For example, where a write is made to disk, inlining involves actually making the write to disk before sending a confirmation that the write has been performed. In contrast, an operation where inlining is not implemented could involve this same write to disk, but where the write is first stored to NVRAM, then a response that the operation is complete is sent before the write has been made to disk.

Regarding a journaling context, when a transition commits, inlining can involve applying one or more associated deltas to a corresponding journal block, rather than storing the delta itself.

In general, checking data integrity can involve determining whether data that is being read from disk is the same as data that was written to disk (i.e., making sure that data in a distributed storage system has not become corrupted, or otherwise incorrect). In this context, and in some examples, at least two types of checksums can be utilized.

One of these checksums can be an initiator checksum—i.e., a checksum that is calculated or determined when writing a particular block in a journaled file system for the first time. With an initiator checksum, inline data checking module 112 can calculate a checksum for an entire block, save for a delta region. A checksum for the delta region (which can be referred to as a journal checksum) can be also calculated, as well as calculated on the journal side, and used to apply deltas.

Figure 2:
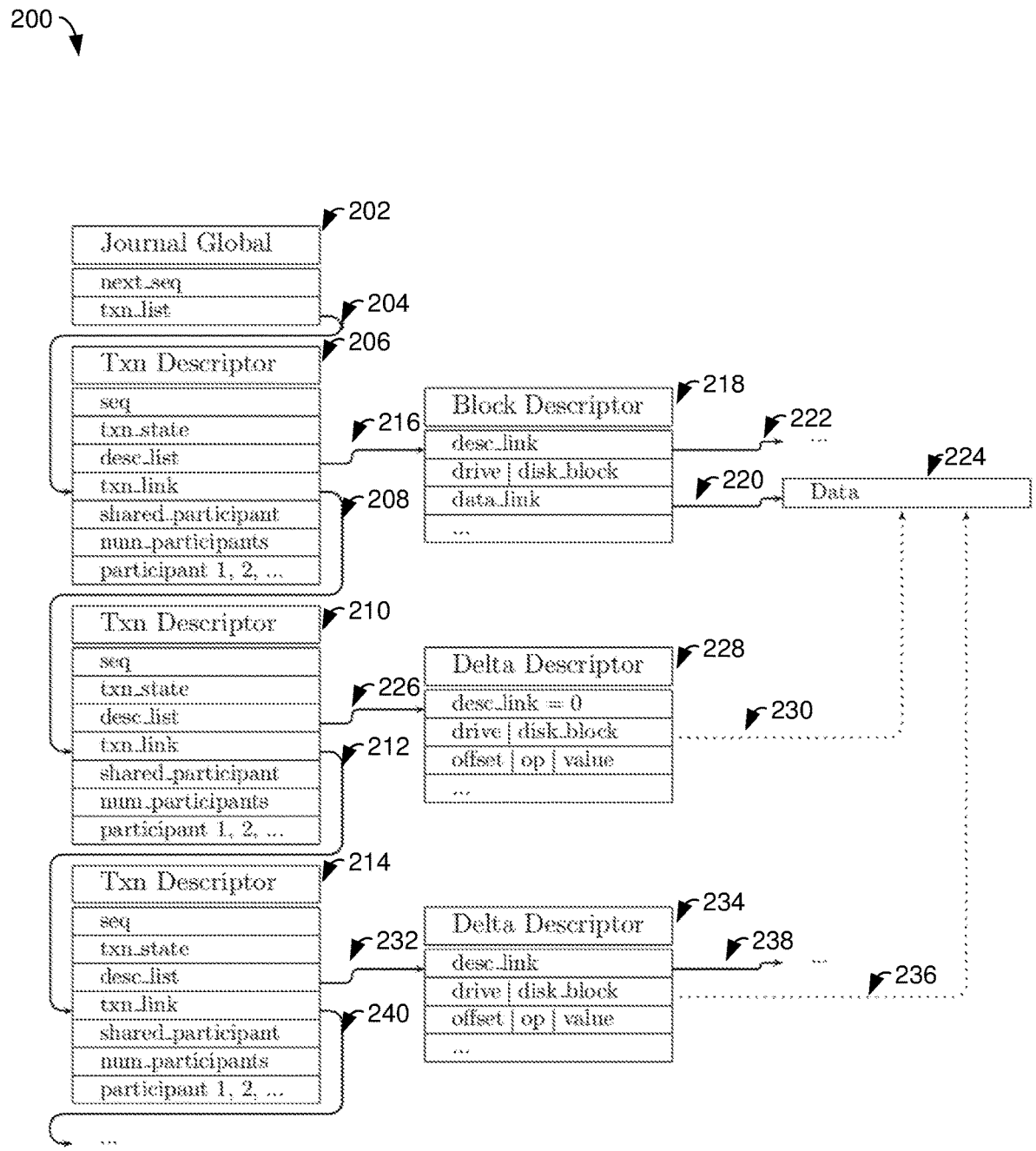
FIG. 2 illustrates an example of a journaled file system that can facilitate checking data integrity in incremental journaling, in accordance with certain embodiments of this disclosure.

FIG. 2 illustrates an example of a journaled file system that can facilitate checking data integrity in incremental journaling in a journaled file system, in accordance with certain embodiments of this disclosure. In some examples, journaled file system 200 can be used to implement some aspects of file system 118 of FIG. 1, and can be stored in NVRAM 124. It can be appreciated that journaled file system is depicted logically, and that there can be various ways to organize a journaled file system in accordance with incremental inline journaling in a journaled file system.

Journaled file system 200 comprises journal global 202, link 204, Txn descriptor 206, link 208, Txn descriptor 210, link 212, Txn descriptor 214, link 216, block descriptor 218, link 220, link 222, data 224, link 226, delta descriptor 228, link 230, link 232, delta descriptor 234, link 236, link 238, and link 240. A link can link one part of journaled file system 200 to another part of journaled file system 200, and in some embodiments, can be implemented as a pointer to a memory address (e.g., a memory address in NVRAM 124 of FIG. 1) where that other part of journaled file system 200 is stored.

As depicted, link 204 points from journal global 202 to Txn descriptor 206. Link 208 points from Txn descriptor 206 to Txn descriptor 210. Link 212 points from Txn descriptor 210 to Txn descriptor 212. Link 216 points from Txn descriptor 216 to block descriptor 218. Link 220 points from block descriptor 218 to data 224. Link 222 points from block descriptor 218, and can point to another aspect of journaled file system 220, such as a delta descriptor (which can be similar to delta descriptor 228).

Link 226 points from Txn descriptor 210 to delta descriptor 228. Link 230 points from delta descriptor 228 to data 224. Link 232 points from Txn descriptor 214 to delta descriptor 234. Link 236 points from delta descriptor 234 to data 226. Link 238 points from delta descriptor 234, and can point to another aspect of journaled file system 220, such as a delta descriptor (which can be similar to delta descriptor 228). Link 240 points from Txn descriptor 214, and can point to another aspect of journaled file system 220, such as a Txn descriptor (which can be similar to Txn descriptor 214).

Journal global 202 can comprise a data structure that has entries for next_seq and txn_list (which can point to a Txn descriptor, such as Txn descriptor 206). Txn descriptor 206, Txn descriptor 210, and Txn descriptor 214 can each comprise a data structure that has entries for seq, txn_state, desc_list, txn_link, shared_participant, num_participants, and participant 1, 2, etc. Using Txn descriptor 210 as a representative example of journaled file system 200, the txn_link entry of Txn descriptor 210 can both be where a pointer (e.g., link 204) from a prior Txn descriptor (e.g., Txn descriptor 206) points to, as well as the location within Txn descriptor 210 that stores a pointer (e.g., link 208) to another Txn descriptor (e.g., Txn descriptor 214). The desc_list field of Txn descriptor 210 can store a pointer (e.g., link 226) to a descriptor data structure, which is here depicted as delta descriptor 218. In some examples, a desc_list field of a Txn descriptor can point (e.g., link 216) to a block descriptor (such as with Txn descriptor 206, where the desc_list field points to block descriptor 218).

Block descriptor 218 can comprise a data structure that has entries for desc_link, drive|disk_block, and data_link. A desc_link field of block descriptor 218 can point (e.g., link 222) to a delta descriptor, which can be similar to delta descriptor 228. A data_link field of block descriptor 218 can point (e.g., link 220) to data, which is depicted here as data 224.

Delta descriptor 218 and delta descriptor 234 can each comprise a data structure that has entries for desc_link, drive|disk_block, and offset|op|value. Using the example of delta descriptor 234, desc_link can point (e.g., link 238) to another delta descriptor, which can be similar to delta descriptor 238. Drive|disk_block can point (e.g., link 236) to data, such as data 224, and can indicate a particular drive and a particular disk block within a distributed file system (e.g., file system 118 of FIG. 1) that is being referenced by one or more operations. Then, an offset|op|value field of delta descriptor 234 can indicate an offset within this disk block (e.g., a location within that disk block), an operation to be performed at that location (e.g., addition), and a value for that operation (e.g., a number to add to a current value at that location).

Data 224 can comprise one or more blocks stored on one or more disks of a distributed file system. Data 224 can also comprise data that is referenced by one or more block descriptors (e.g. block descriptor 218) and/or delta descriptors (e.g., delta descriptor 228 and delta descriptor 234).

In some examples, a respective journal checksum can be stored in a Txn descriptor. That is, each of Txn descriptor 206, Txn descriptor 210, and Txn descriptor 214 can store a journal checksum. Furthermore, these journal checksums can be stored in memory (e.g., in NVRAM 124 of FIG. 1). Then, initiator checksums can be stored with their respective block on disk (e.g., on disk 122 of FIG. 1).

Example Process Flows

Figure 3:
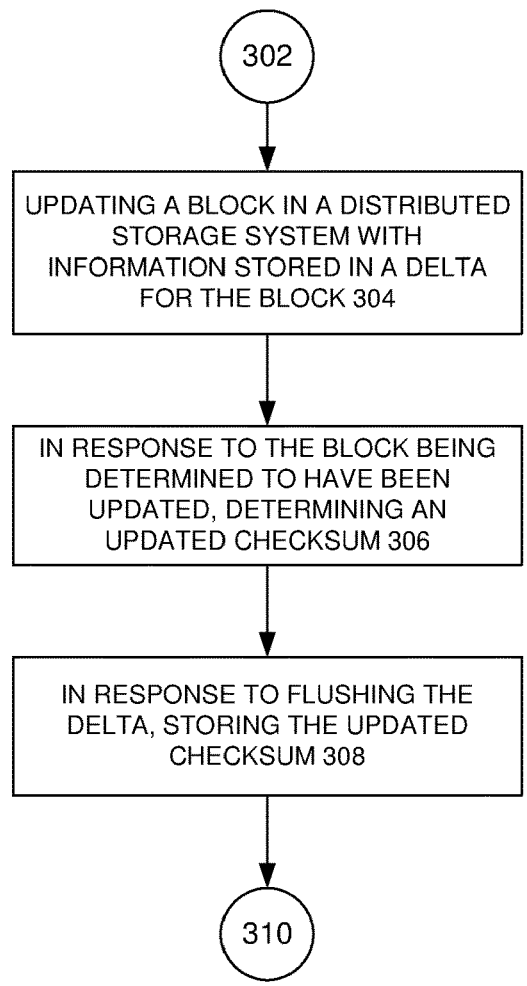
FIG. 3 illustrates an example process flow for determining an incremental checksum for checking data integrity in incremental journaling, in accordance with certain embodiments of this disclosure.

FIG. 3 illustrates an example process flow for determining an incremental checksum for checking data integrity in incremental journaling, in accordance with certain embodiments of this disclosure. It can be appreciated that process flow 300 is an example process flow, and that there can be embodiments that implement more or fewer operations than are depicted in process flow 300, or that implement the operations of process flow 300 in a different order than is depicted in process flow 300.

In some embodiments, process flow 300 can be implemented with server 102 of FIG. 1 as server 102 modifies files of file system 118 in response to transaction requests from client computer 104a and/or client computer 104b. The process flow of FIG. 3 begins with 302, and then moves to operation 304.

Operation 304 depicts updating a block in a distributed storage system with information stored in a delta for the block, the block corresponding to a checksum. For example, a sub-portion of a block can be modified. Then, there can be a checksum that is maintained for this block, so the checksum can be updated to reflect that the block is updated. In some examples, a checksum can be determined by implementing aspects of process flow 400 of FIG. 4, process flow 500 of FIG. 5, or process flow 600 of FIG. 6. In some examples, the checksum can comprise a CRC checksum or a Fletcher checksum.

In some examples, the delta for the block comprises delta information about the block that is to be changed in the block. In some examples, the block comprises metadata about a file of the distributed storage system that is stored to a disk of the distributed storage system.

In some examples, the file is stored to a disk of the distributed storage system (e.g., disk 122 of FIG. 1). In some examples, the distributed storage system is stored across computing node devices of a computing cluster.

After operation 304, the process flow of FIG. 3 moves to operation 306.

Operation 306 depicts, in response to the block being determined to have been updated, determining an updated checksum for the block. In some examples, determining the updated checksum comprises incrementally updating the checksum.

In some examples, checksum comprises a first portion and a second portion, wherein the incrementally updating the checksum comprises modifying the first portion to produce a modified first portion, and wherein the updated checksum comprises the modified first portion and the second portion. In some examples, operation 306 comprises reading the checksum from the distributed storage system, and using the read checksum to determine the updated checksum.

After operation 306, the process flow of FIG. 3 moves to operation 308. Operation 308 depicts, in response to flushing the delta from the distributed storage system, storing the updated checksum in a second memory of the distributed storage system. In some examples, flushing in operation 308 comprises removing the delta from the distributed storage system; removing a link between the block and the delta; or freeing a memory space used to store the delta.

In some examples, operation 308 comprises implementing a file lock on at least a part of the block that comprises the checksum while storing the updated checksum, and the updated checksum can be stored in the block. That is, a lock may be implemented on a sub-portion of the block (which contains the checksum) while storing the updated checksum to this sub-portion of the block.

In some examples, the memory of the distributed storage system comprises RAM, or NVRAM. After operation 308, the process flow of FIG. 3 moves to operation 310, where the process flow of FIG. 3 ends.

Figure 4:
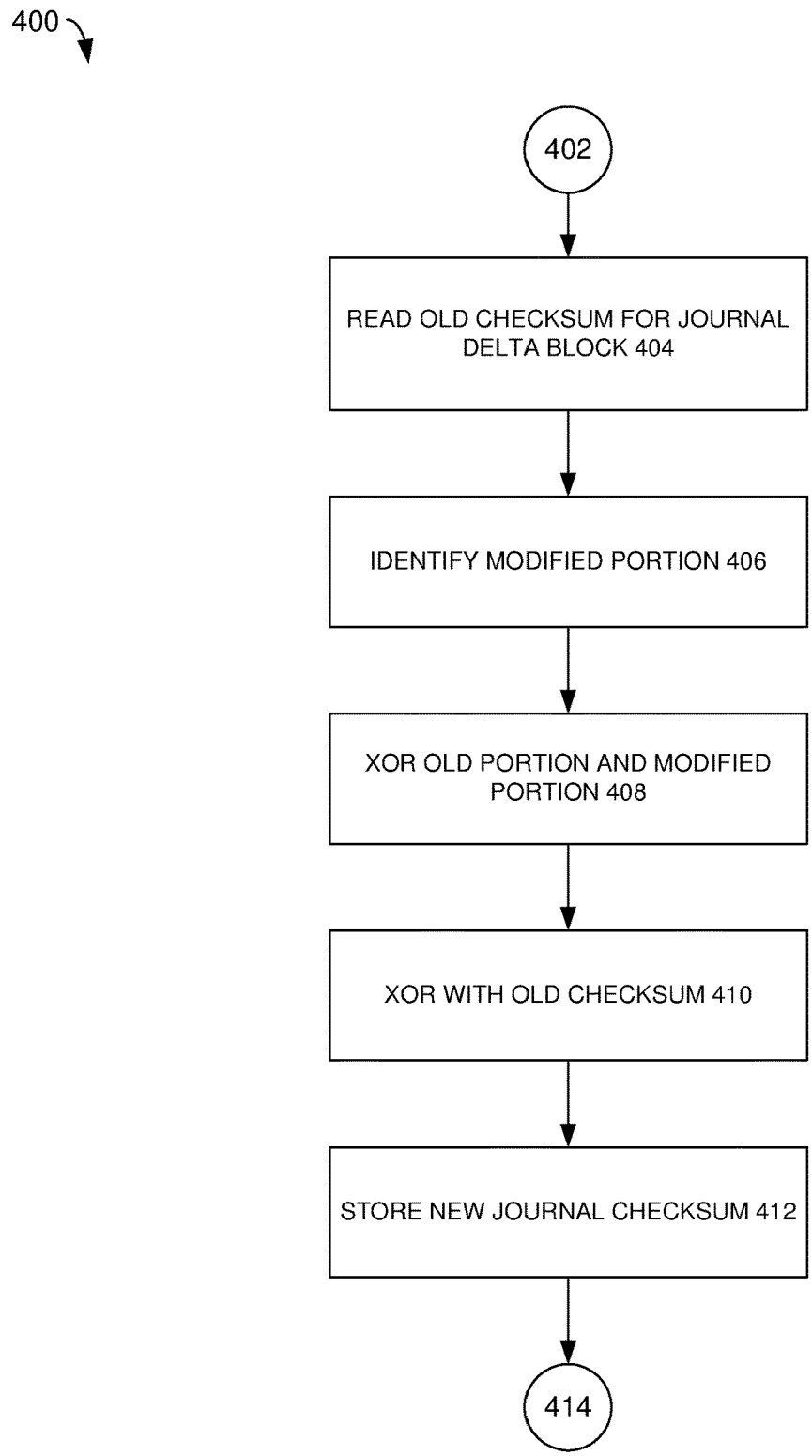
FIG. 4 illustrates an example process flow for determining a checksum for checking data integrity in incremental journaling, in accordance with certain embodiments of this disclosure.

FIG. 4 illustrates an example process flow for determining a checksum for checking data integrity in incremental journaling, in accordance with certain embodiments of this disclosure. It can be appreciated that process flow 400 is an example process flow, and that there can be embodiments that implement more or fewer operations than are depicted in process flow 400, or that implement the operations of process flow 400 in a different order than is depicted in process flow 400.

In some embodiments, process flow 400 can be implemented with server 102 of FIG. 1 as server 102 modifies files of file system 118 in response to transaction requests from client computer 104a and/or client computer 104b. The process flow of FIG. 4 begins with 402, and then moves to operation 404.

Operation 404 depicts reading an old checksum for a journaled delta block. This old checksum can be, for example, a journal checksum, and can be read by inline data checking module 112 of FIG. 1 from NVRAM 124. After operation 404, the process flow of FIG. 4 moves to operation 406.

Operation 406 depicts identifying a modified portion of the corresponding data. For example, a modification to a block can be identified by an offset from the start of the block and a size of the modification. Operation 406 can comprise reading the current value stored in this sub-portion of a block. After operation 406, the process flow of FIG. 4 moves to operation 408.

Operation 408 depicts performing an XOR between the old portion and the new modified portion of the data. For example, let the data be represented as ABC, with B being the data that is modified—modified to B'. This can be expressed as CRC(0B0) XOR CRC(0B'0), where CRC( ) is a function to create a cyclic redundancy check (CRC) checksum. It can be appreciated that a CRC checksum is an example checksum, and that there can be other types of checksums utilized. In a bitwise XOR with two input values, the output is 1 if one input is 1 and one input is 0, and the output is 0 if both inputs are 1 or both inputs are 0. That is, 0 XOR 1=1; 1 XOR 0=1; 0 XOR 0=0; and 1 XOR 1=0.

By padding both B and B' with leading and trailing zeroes (e.g., 0B0 and 0B'0), a length of these values can be made equal to the data ABC. 0 XOR 0=0, so the leading and trailing zeroes will remain after the XOR operation is performed. After operation 408, the process flow of FIG. 4 moves to operation 410.

Operation 410 depicts performing an XOR between the old checksum and the result of operation 408. The old checksum can be expressed as CRC(ABC). Then, the XOR operation can be expressed as CRC(ABC) XOR (CRC(0B0) XOR CRC(0B'0)), where CRC(0B0) XOR CRC(0B'0) is determined in operation 408. Put together, the operations 404-410 can be expressed as:

$$CRC(AB'C)=CRC(ABC) \text{ XOR } CRC(0B0) \text{ XOR } CRC(0B'0)$$

After operation 410, the operating procedures of FIG. 4 move to operation 412.

Operation 412 depicts storing the new journal checksum. This new journal checksum can be the result of operation 410. This new journal checksum can be stored where the old journal checksum was previously stored. For example, where the old journal checksum was stored in a known location in NVRAM 124 of FIG. 1, the new journal checksum can be stored in this known location, thereby overwriting the old journal checksum. After operation 412, the process flow of FIG. 4 moves to operation 414, where the process flow of FIG. 4 ends.

Figure 5:
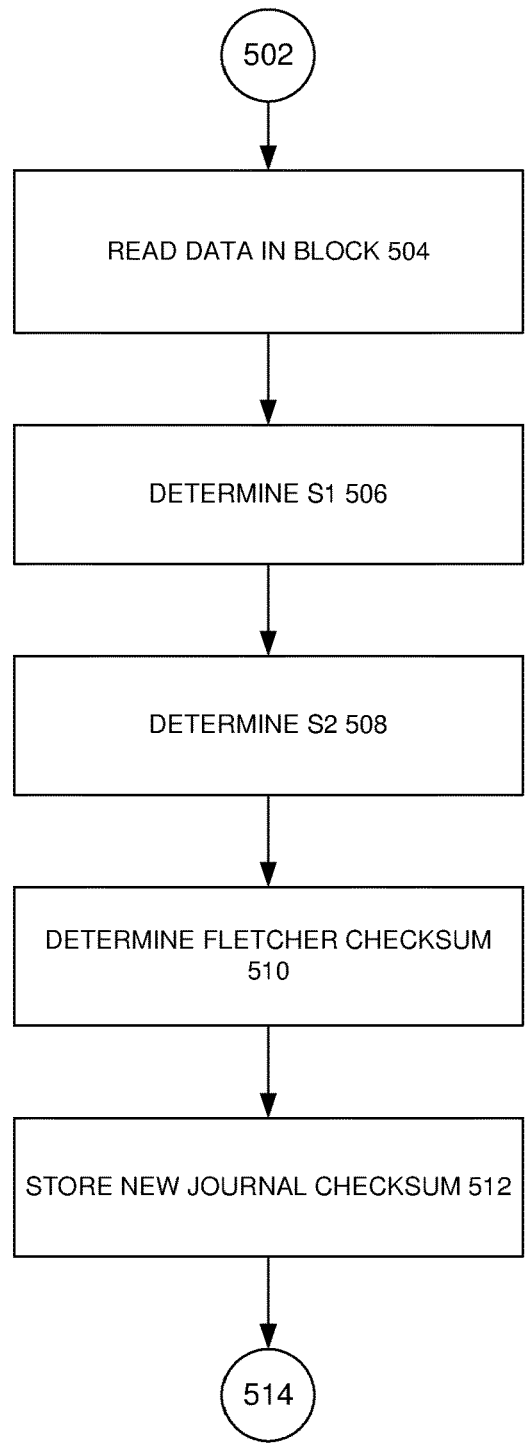
FIG. 5 illustrates an example process flow for determining an initiator checksum for checking data integrity in incremental journaling, in accordance with certain embodiments of this disclosure.

FIG. 5 illustrates an example process flow for determining an initiator checksum for checking data integrity in incremental journaling, in accordance with certain embodiments of this disclosure. It can be appreciated that process flow 500 is an example process flow, and that there can be embodiments that implement more or fewer operations than are depicted in process flow 500, or that implement the operations of process flow 500 in a different order than is depicted in process flow 500.

In some embodiments, process flow 500 can be implemented with server 102 of FIG. 1 as server 102 modifies files of file system 118 in response to transaction requests from client computer 104a and/or client computer 104b. The process flow of FIG. 5 begins with 502, and then moves to operation 504.

Operation 504 depicts reading data in a block. For example, this can be performed by inline data checking module 112 of FIG. 1 reading data stored in a block on disk 122. The data that is read can be represented as (D1,D2,D3). After operation 504, the operating procedures of FIG. 5 move to operation 506.

Operation 506 depicts determining an intermediary value, S1, with S1=(1+D1+D2+D3) mod 255. mod 255 indicates performing modular arithmetic on (1+D1+D2+D3), with a modulus of 255. That is, the output value is restricted between 0 and 255. So, 5 mod 255 equals 5, and 260 mod 255 equals 5. By performing modular arithmetic with a modulus of 255, a value of each of S1 and of S2 can be constrained to an eight-bit value (where, in some examples, eight computer bits are used to represent values between 0 and 255, inclusive). After operation 506, the process flow of FIG. 5 moves to operation 508.

Operation 508 depicts determining a second intermediary value, S2, with S2=((X*D1)+((X−1)*D2)+((X−2)*D3)) mod 255. Here, X represents a number of data elements in the data (D1,D2,D3), which is 3 in this example, and the size of each element is one byte. So, D2 is multiplied by the number of data elements (X, or 3) less the size of one element, expressed in bytes (1). Similarly, D3 is multiplied by the number of data elements (X, or 3) less the size of two elements, expressed in bytes (2).

It can be appreciated that, where a different number of data elements are used, a similar approach can be taken. This can be generalized to S2=(n*D1+(n−1)*D2+(n−2)*D3+ . . . +(1*Dn)) mod 255, where there are n elements of size 1 byte. After operation 508, the process flow of FIG. 5 moves to operation 510.

Operation 510 depicts determining a Fletcher checksum based on S2 and S1, specifically Fletcher(D1,D2,D3)=(S2<<8)|S1. Fletcher( ) represents a Fletcher checksum.

Using a 16-bit value to represent the Fletcher checksum, S2 can occupy the left eight bits of the 16-bit value (S2<<8 can represent bitwise shifting S2 eight bits to the left so that it has eight trailing zeros), and S1 can occupy the right eight bits of the 16-bit value. That is (S2<<8)|S1 can represent performing a bitwise OR on these two values (the | symbol representing OR). Since, the rightmost eight bits of S2<<8 are all zeroes and the result of performing an OR on a given bit and a 0 is the value of the given bit, then (S2<<8)|S1 will result in a 16-bit value containing S2 in its leftmost 8 bits and S1 in its rightmost eight bits.

Put together, these operations 506-510 can be expressed as:

$$S1=(1+D1+D2+D3) \bmod 255$$

$$2=((X*D1)+((X-1)*D2)+((X-2)*D3)) \bmod 255$$

$$\text{Fletcher}(D1,D2,D3)=(S2<<8)|S1$$

After operation 510, the process flow of FIG. 5 moves to operation 512.

Operation 512 depicts saving the result of operation 510 as a journal checksum. In some examples, this journal checksum can be saved in NVRAM 124 of FIG. 1 in a known location, so that it can be accessed later. After operation 512, the process flow of FIG. 5 moves to operation 514, where the process flow of FIG. 5 ends.

Figure 6:
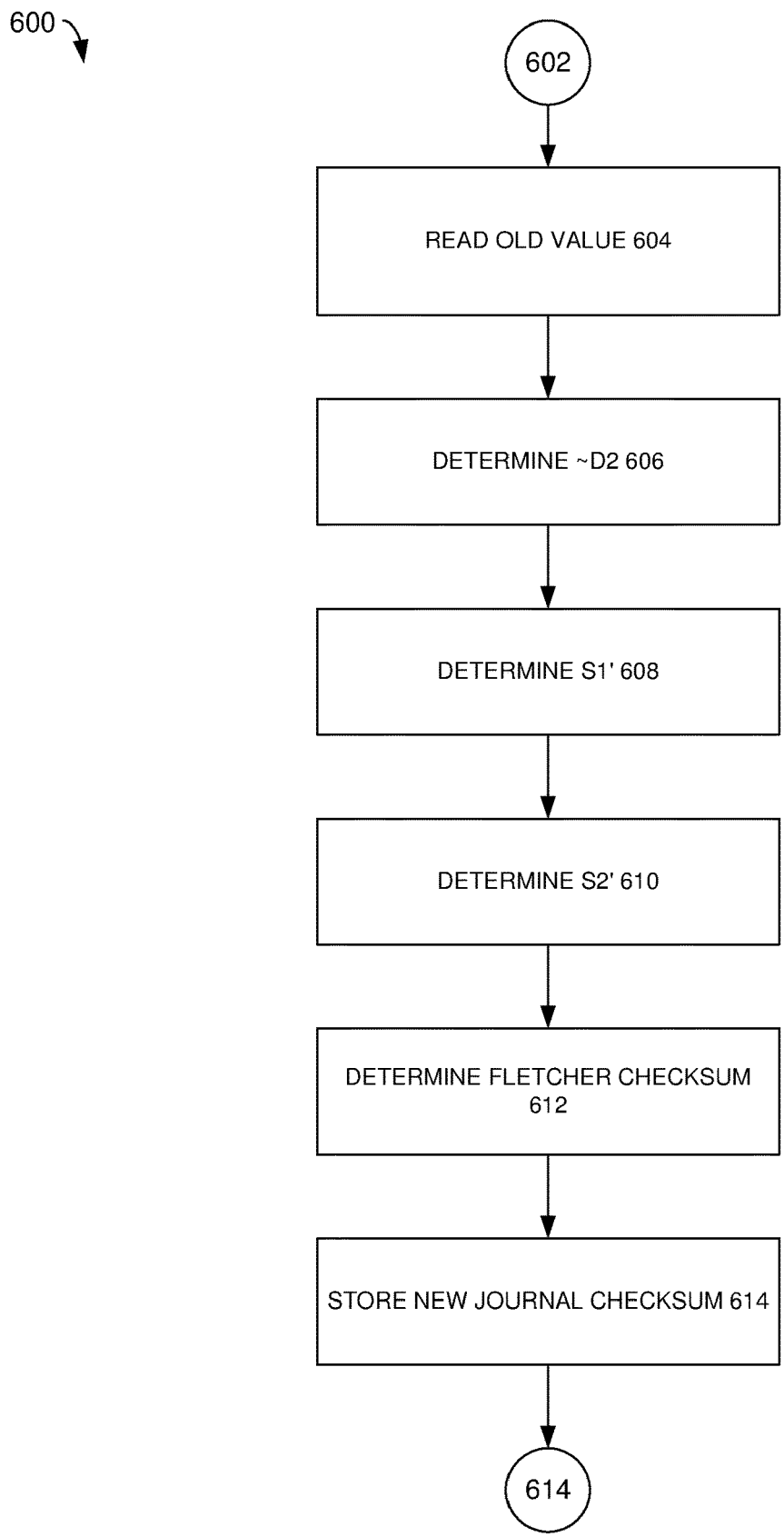
FIG. 6 illustrates an example process flow for determining a journal checksum for checking data integrity in incremental journaling, in accordance with certain embodiments of this disclosure.

FIG. 6 illustrates an example process flow for determining a journal checksum for checking data integrity in incremental journaling, in accordance with certain embodiments of this disclosure. It can be appreciated that process flow 600 is an example process flow, and that there can be embodiments that implement more or fewer operations than are depicted in process flow 600, or that implement the operations of process flow 600 in a different order than is depicted in process flow 600.

In some embodiments, process flow 600 can be implemented with server 102 of FIG. 1 as server 102 modifies files of file system 118 in response to transaction requests from client computer 104a and/or client computer 104b. The process flow of FIG. 6 begins with 602, and then moves to operation 604.

Operation 604 depicts reading an old value for the data. For example, using the example where the data is (D1,D2,D3), and where the data modified is D2, which is modified to produce D2', reading the old value for the data can comprise reading data D2. After operation 604, the process flow of FIG. 6 moves to operation 606.

Operation 606 depicts determining an intermediary value ~D2, where ~D2=(D2'−D2). This can be an arithmetic operation performed on the old data (D2) and the modified data (D2') to produce the intermediary value ~D2'. After operation 606, the process flow of FIG. 6 moves to operation 608.

Operation 608 depicts determining an intermediary value, S1', with S1'=S1'=(S1+~D2) mod 255. After operation 608, the process flow of FIG. 6 moves to operation 610.

Operation 610 depicts determining an intermediary value, S2', with S2'=(S2+(X−offset of D2)*(D2'−D2)) mod 255. The value X can have a similar meaning as in operation 508 of FIG. 5. That is, here, X represents a number of data elements in the data (D2). After operation 610, the process flow of FIG. 6 moves to operation 612.

Operation 612 depicts determining a Fletcher checksum based on S2' and S1', specifically Fletcher(D1,D2',D3)=(S2'<<8)|S1'. Operation 612 can be implemented in a similar manner as operation 510 of FIG. 5.

Put together, these operations 606-612 can be expressed as:

$$\sim D2 = (D2' - D2)$$

$$S1' = (S1 + \sim D2) \bmod 255$$

$$S2' = (S2 + (n\text{-offset of } D2) * (D2' - D2)) \bmod 255$$

$$\text{Fletcher}(D1, D2', D3) = (S2' \ll 8) | S1'$$

After operation 612, the process flow of FIG. 6 moves to operation 614.

Operation 614 depicts storing the new journal checksum. This new journal checksum can be the result of performing operation 612. This new journal checksum can be stored to a location where the old journal checksum was read from in operation 604. After operation 614, the operating procedures of FIG. 6 move to operation 616, where the operating procedures of FIG. 6 end.

Figure 7:
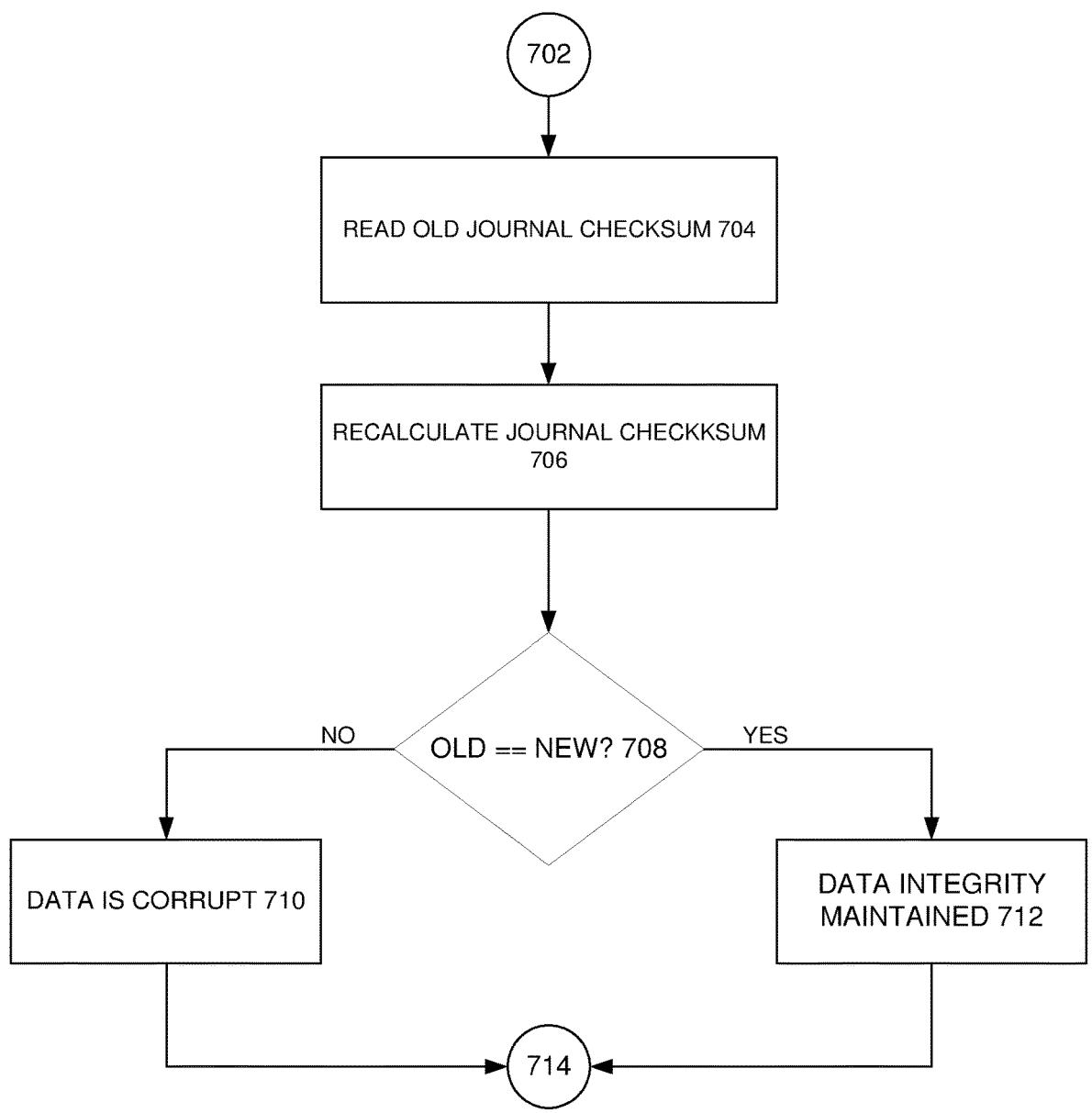
FIG. 7 illustrates an example process flow for checking data integrity in incremental journaling, in accordance with certain embodiments of this disclosure.

FIG. 7 illustrates an example process flow for checking data integrity in incremental journaling, in accordance with certain embodiments of this disclosure. It can be appreciated that process flow 700 is an example process flow, and that there can be embodiments that implement more or fewer operations than are depicted in process flow 700, or that implement the operations of process flow 700 in a different order than is depicted in process flow 700.

In some embodiments, process flow 700 can be implemented with server 102 of FIG. 1 as server 102 modifies files of file system 118 in response to transaction requests from client computer 104a and/or client computer 104b. The process flow of FIG. 7 begins with 702, and then moves to operation 704.

Operation 704 depicts reading an old journal checksum. This old journal checksum can be a checksum stored in NVRAM 124 of FIG. 1. After operation 704, the process flow of FIG. 7 moves to operation 706.

Operation 706 depicts recalculating the journal checksum. Calculating a checksum in operation 706 can be performed by implementing aspects of process flow 400 of FIG. 4, process flow 500 of FIG. 5, or process flow 600 of FIG. 6. After operation 706, the process flow of FIG. 7 moves to operation 708.

Operation 708 depicts determining whether the old journal checksum (i.e., the journal checksum of operation 704 and the new journal checksum (i.e., the journal checksum of operation 706) are equal. Where the journal checksums represent numbers or strings of bits, this can be effectuated with an arithmetic or bitwise comparison of the two values. If, in operation 708, it is determined that the old journal checksum and the new journal checksum are not equal, then the operating procedures of FIG. 7 move to operation 710. Instead, if, in operation 708, it is determined that the old journal checksum and the new journal checksum are equal, then the operating procedures of FIG. 7 move to operation 712.

Operation 710 is reached from operation 708 where it is determined in operation 708 that the old journal checksum and the new journal checksum are not equal. Operation 710 depicts determining that the data is corrupt. This can be the data referenced by the two checksums. This data can be determined to be corrupt because, where the old journal checksum was determined after the last known write of the data, and this new journal checksum was determined now, then the data was modified in an unknown way (i.e., there was no known write to modify the data).

Where the data is determined to be corrupt, it can be flushed from a distributed storage system. In some examples, an alert can be raised, such as by writing to a log file an indication of which data was found to be corrupt, and when. After operation 710, the operating procedures of FIG. 7 move to operation 714, where the operating procedures of FIG. 7 end.

Operation 712 is reached from operation 708 where it is determined in operation 708 that the old journal checksum and the new journal checksum are equal. Where the old journal checksum and the new journal checksum are equal, it can indicate that the data has not become corrupt, and things are operating normally. So, the data can be considered to still be valid, and further operations on it can take place. After operation 712, the operating procedures of FIG. 7 move to operation 714, where the operating procedures of FIG. 7 end.

Figure 8:
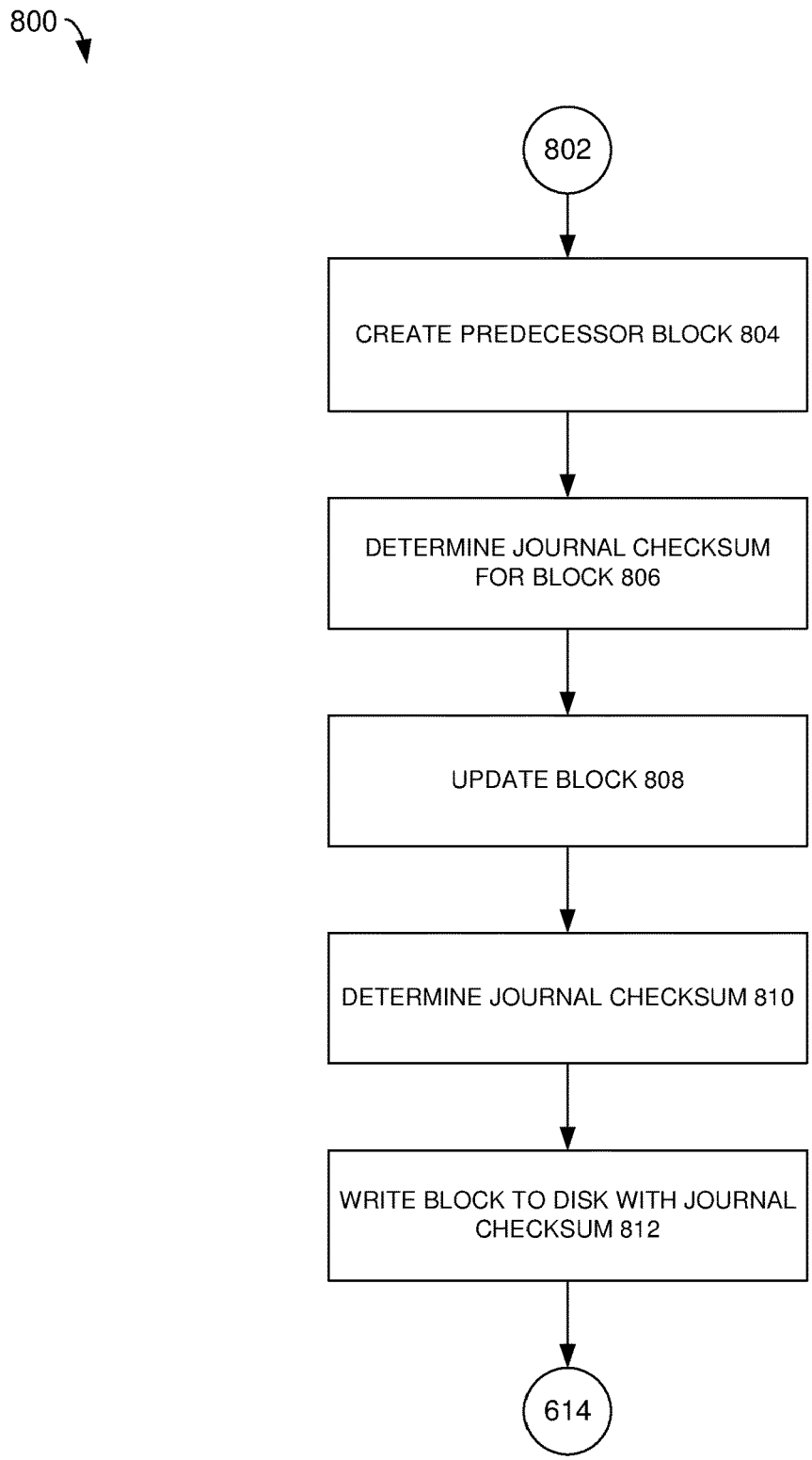
FIG. 8 illustrates an example process flow for creating a checksum, and incrementally updating the checksum along with incremental journaling, in accordance with certain embodiments of this disclosure.

FIG. 8 illustrates an example process flow for creating a checksum, and incrementally updating the checksum along with incremental journaling, in accordance with certain embodiments of this disclosure. It can be appreciated that process flow 800 is an example process flow, and that there can be embodiments that implement more or fewer operations than are depicted in process flow 800, or that implement the operations of process flow 800 in a different order than is depicted in process flow 800.

In some embodiments, process flow 800 can be implemented with server 102 of FIG. 1 as server 102 modifies files of file system 118 in response to transaction requests from client computer 104a and/or client computer 104b. The process flow of FIG. 8 begins with 802, and then moves to operation 804.

Operation 804 depicts creating a predecessor block. Where deltas are created, they can be created relative to a predecessor block. Where a delta is created and there is no corresponding predecessor block, then a predecessor block can be created. After operation 804, the process flow of FIG. 8 moves to operation 806.

Operation 806 depicts determining a journal checksum for the predecessor block. This journal checksum can be a checksum for the predecessor block, save for the checksum field, in ondisk format on the block. In examples, the checksum can be determined by implementing aspects of process flow 400 of FIG. 4, process flow 500 of FIG. 5, and/or process flow 600 of FIG. 6. After operation 806, the process flow of FIG. 8 moves to operation 808.

Operation 808 depicts updating the predecessor block. A predecessor block can be updated in response to a transaction to modify a corresponding file. After operation 808, the process flow of FIG. 8 moves to operation 810.

Operation 810 depicts determining an updated checksum. This can be an incrementally updated checksum, which can be determined by implementing aspects of process flow 400 of FIG. 4, process flow 500 of FIG. 5, and/or process flow 600 of FIG. 6. After operation 810, the process flow of FIG. 8 moves to operation 812.

Operation 812 depicts writing the block to disk with the journal checksum. When the block is flushed to disk, the updated checksum of operation 810 can be written with the block, in ondisk format. After operation 812, the operating procedures of FIG. 8 move to operation 814, where the operating procedures of FIG. 8 end.

Example Operating Environments

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein. For example, aspects of distributed storage system 900 and computer 1002 can be used to implement server 102 of FIG. 1, and aspects of computer 1002 can be used to implement client computer 104a and client computer 104b of FIG. 1.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 can use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, can be still stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include cloud metadata objects (CMOs), cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data can be represented by clear, adding existing file information to the cache can be represented by fill, adding new information to the cache by write, reading information from the cache can be represented by read following a fill, updating existing file information to the cache can be represented by fill followed by a write, and truncating cache due to file operation can be represented by sync and then a partial clear.

In one implementation, the caching component 940 can track any operations performed on the cache. For example, any operation touching the cache can be added to a queue prior to the corresponding operation being performed on the cache. For example, before a fill operation, an entry can be placed on an invalidate queue as the file and/or regions of the file will be transitioning from an uncached state to cached state. In another example, before a write operation, an entry can be placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream (ADS). It can be appreciated that ADS can be based on the New Technology File System (NTFS) ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; and (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached," the region can be filled; (7) the cache tracking tree can updated to mark the cache region as dirty; (8) the data can be written to the cache region; and (9) the lock can be deactivated.

In one implementation, data can be cached at the time of a first read. For example, if the state associated with the data range called for in a read operation is non-cached, then this can be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

FIG. 10 illustrates a block diagram of a computer 1002 operable to execute the disclosed communication architecture. To provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), and/or device(s) disclosed herein can each include at least a portion of the computer 1002. The system bus 1008 can couple system components including, but not limited to, the system memory 1006 to the processing unit 1004. The processing unit 1004 can be any of various commercially-available or custom processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 can include ROM 1010 and RAM 1012. A basic input/output system (BIOS) can be stored in a non-volatile memory 1010 such as ROM, erasable programmable read-only memory (EPROM), EEPROM, where the BIOS can contain the basic routines that help to transfer information between elements within the computer 1002, such as during startup. The RAM 1012 can also include a high-speed RAM such as static RAM for caching data, or NVRAM.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disc drive 1020, (e.g., reading a CD-ROM disc 1022 or, to read from or write to other high capacity optical media such as the DVD). The hard disk drive 1014, magnetic disk drive 1016 and optical disc drive 1020 can be connected to the system bus 1008 by a hard disk drive interface 1024, a magnetic disk drive interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1002, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired or wireless input devices, e.g., a keyboard 1038 and/or a pointing device, such as a mouse 1040 or a touch screen or touchpad (not illustrated). These and other input devices can be connected to the processing unit 1004 through an input device interface 1042 that is coupled to the system bus 1008, but can be connected by other interfaces, such as a parallel port, an IEEE 1394 port, a game port, a USB port, an infrared (IR) interface, etc. A monitor 1044 or other type of display device can also be connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and can include many or all the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, can be connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
updating a block in a distributed storage system with information stored in a delta for the block, the block corresponding to a checksum;
in response to the block being determined to have been updated, determining an updated checksum for the block; and
in response to flushing the delta from the distributed storage system, storing the updated checksum in a second memory of the distributed storage system.

2. The system of claim 1, wherein determining the updated checksum comprises incrementally updating the checksum.

3. The system of claim 2, wherein the checksum comprises a first portion and a second portion, wherein the incrementally updating the checksum comprises modifying the first portion to produce a modified first portion, and wherein the updated checksum comprises the modified first portion and the second portion.

4. The system of claim 1, wherein the delta for the block comprises delta information about the block that is to be changed in the block.

5. The system of claim 1, wherein the block comprises metadata about a file of the distributed storage system that is stored to a disk of the distributed storage system.

6. The system of claim 1, wherein the flushing the delta from the distributed storage system further comprises:
removing the delta from the distributed storage system.

7. The system of claim 1, wherein the flushing of the delta from the distributed storage system comprises:

removing, by the distributed storage system, a link between the block and the delta.

8. A method, comprising:

updating, by a distributed storage system comprising memories, a block in the distributed storage system with information stored in a delta for the block, the block corresponding to a checksum;

based on the block being updated to an updated block, determining, by the distributed storage system, an updated checksum for the updated block; and in response to flushing the delta from the distributed storage system, storing, by the distributed storage system, the updated checksum in a memory of the memories of the distributed storage system.

9. The method of claim 8, wherein the flushing the delta from the distributed storage system comprises:

freeing, by the distributed storage system, a memory space used to store the delta.

10. The method of claim 8, wherein the file is stored to a disk of the distributed storage system.

11. The method of claim 8, wherein the updated checksum is stored in the block.

12. The method of claim 11, further comprising:

implementing, by the distributed storage system, a file lock on at least a part of the block that comprises the checksum while storing the updated checksum.

13. The method of claim 8, wherein the checksum comprises a cyclic redundancy check (CRC) code.

14. The method of claim 8, wherein the checksum comprises a Fletcher checksum.

15. A computer-readable storage medium comprising instructions that, in response to execution, cause a system comprising a processor to perform operations, comprising:

updating a block in a distributed storage system with information stored in a delta for the block, the block corresponding to a checksum;

in response to flushing the delta from the distributed storage system, determining an updated checksum for the block as a result of updating the block; and storing the updated checksum in a memory of the distributed storage system.

16. The computer-readable storage medium of claim 15, wherein the determining the updated checksum for the block comprises:

reading the checksum from the distributed storage system.

17. The computer-readable storage medium of claim 15, wherein the storing the updated checksum comprises:

storing the updated checksum to a location where the checksum has been stored.

18. The computer-readable storage medium of claim 15, wherein the distributed storage system is stored across computing node devices of a computing cluster.

19. The computer-readable storage medium of claim 15, wherein the memory of the distributed storage system comprises a random access memory (RAM).

20. The computer-readable storage medium of claim 15, wherein the RAM comprises non-volatile RAM (NVRAM).

* * * * *